Nov. 26, 1935.　　H. S. EBERHARD　　2,022,080
TRACTOR
Filed Dec. 16, 1933　　2 Sheets-Sheet 1
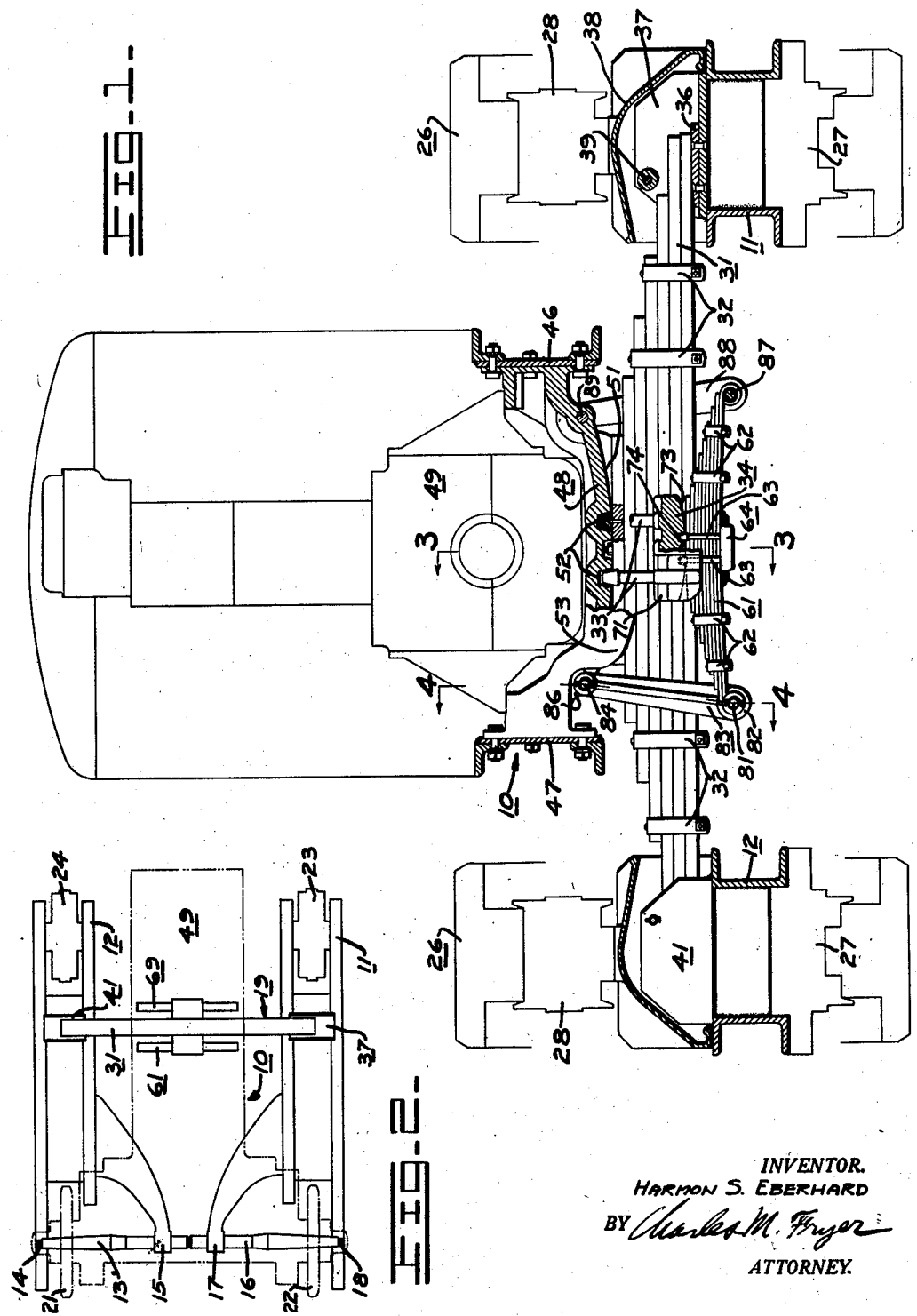
INVENTOR.
HARMON S. EBERHARD
BY
ATTORNEY.

Nov. 26, 1935.  H. S. EBERHARD  2,022,080
TRACTOR
Filed Dec. 16, 1933  2 Sheets-Sheet 2
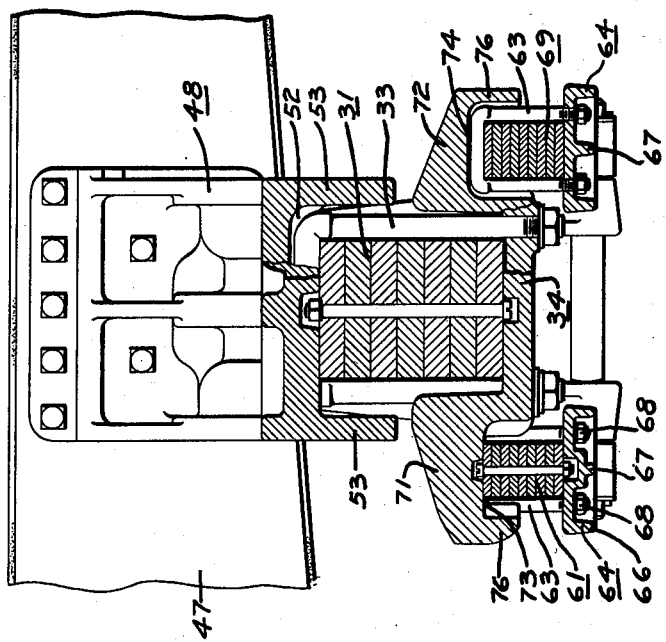
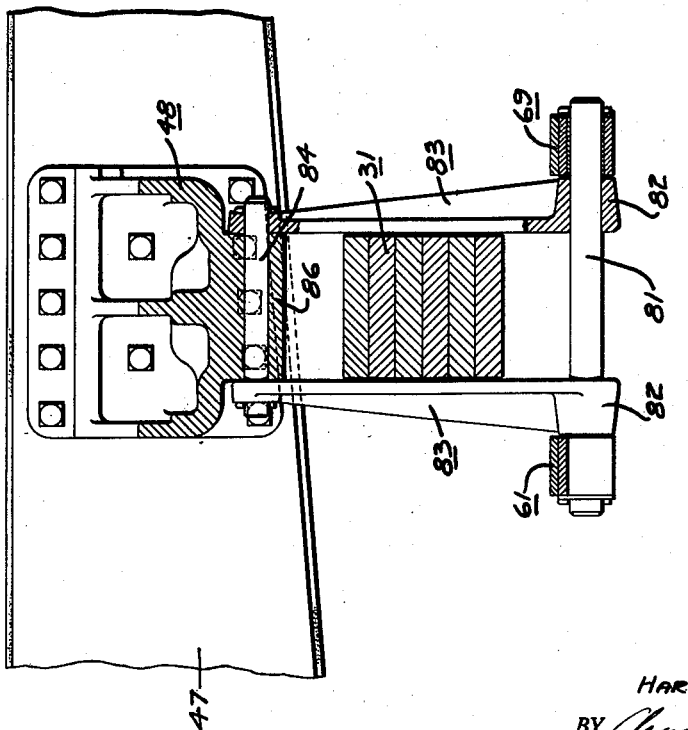
INVENTOR.
HARMON S. EBERHARD
BY Charles M. Fryer
ATTORNEY.

Patented Nov. 26, 1935

2,022,080

UNITED STATES PATENT OFFICE 2,022,080

TRACTOR

Harmon S. Eberhard, Peoria, Ill., assignor to Caterpillar Tractor Co., San Leandro, Calif., a corporation of California Application December 16, 1933, Serial No. 702,652

17 Claims. (Cl. 305—9)

The present invention relates to track-type tractors, and more particularly to the provision of equalizing means for connecting the main frame of the tractor to the endless track mechanisms thereof.

It is an object of the invention to provide improved equalizing means between the main frame and the endless track mechanisms of track-type tractors, the construction of which provides an improved equalizing action particularly adapted for heavy duty tractors.

Another object of the invention is to provide improved equalizing means between the main frame and the endless track mechanisms of a track-type tractor which is of a compact structure, affording maximum clearance for the tractor in passing over obstructions.

Another object of the invention is to provide improved equalizing means for supporting the track-type tractor main frame on the endless track mechanisms, said means providing a simple and compact construction which can be economically manufactured and assembled.

Other objects will appear as the description progresses.

Description of figures

Fig. 1 is a vertical transverse sectional view taken immediately in front of the equalizer bar suspension for the main frame on the endless track mechanisms, looking toward the front of the tractor.

Fig. 2 is a schematic plan view of a track-type tractor, illustrating the connections between the main frame and the track roller or truck frames of the endless track mechanisms.

Fig. 3 is a sectional view taken in the plane of the line 3—3 in Fig. 1.

Fig. 4 is a sectional view taken in the plane of the line 4—4 in Fig. 1.

Description of mechanism

The track-type tractor disclosed herein includes a main frame or body, comprising a transmission case and a forwardly extending framework for supporting the engine, which is pivotally and resiliently supported on a pair of endless track mechanisms. The endless track mechanisms, therefore, are capable of restrained oscillatory movement with respect to the main frame when the tractor is travelling. Each endless track mechanism includes a track roller or truck frame having a plurality of track rollers mounted thereon, which run over the ground stretch of the endless track, transmitting the weight of the tractor thereto. The tractor is propelled over the tracks by a pair of final drive sprockets mounted on the transmission case at the rear of the track roller frames; the drive sprockets also serving to pick up the tracks, which pass over track carrier rollers and front idler wheels on the track roller frames.

Main frame 10 (Fig. 2) is supported on opposite track roller frames 11, 12. Stub shaft 13, mounted in frame 10, provides spaced pivotal connections at 14, 15 between the main frame and track roller frame 12; and similar stub shaft 16 similarly pivotally connects track roller frame 11 to the main frame at 17, 18. The spaced pivotal connections serve to maintain the endless track mechanisms in alignment with the main frame. The front end of said main frame is supported on track roller frames 11, 12 by resilient equalizing means indicated generally at 19 in Fig. 2, and described more specifically hereinafter.

The endless tracks pass over final drive sprockets 21, 22, mounted on main frame 10 at the rear of respective track roller frames 11, 12, and over front idler wheels 23, 24 mounted in the front ends of frames 11, 12. Said tracks are indicated generally at 26 in Fig. 1; and the weight of the tractor is transmitted to the ground stretches of the tracks by track rollers 27 mounted on frames 11, 12, the upper stretches of tracks 26 being supported by track carrier rollers 28 on frames 11, 12. Thus, the body of the tractor is supported on a pair of endless track mechanisms which can oscillate independently with respect thereto in travelling over the ground; such oscillations being governed, however, by resilient equalizing means which will now be described.

The resilient equalizing means, or spring suspension, for supporting the front end of the tractor body on the track roller frames comprises a main equalizing bar or spring having its ends resting freely on the respective track roller frames for lateral sliding play with respect thereto, and being yieldably connected intermediate its ends to a body member of the tractor for limited rocking movement with respect to said member. Such main equalizer spring or bar is held against the body member by a pair of similar auxiliary springs or bars disposed at each side thereof. Opposite ends of the auxiliary springs are connected to the body member; central portions thereof engaging arcuate surfaces of a bracket under the main equalizing member. The engaging portions of the body member and the equalizing spring, and of said auxiliary springs and said bracket have inter-engaging portions which permit relative rocking movement therebetween, while restraining relative lateral movement of said springs with respect to said body member.

Main equalizer spring or bar 31 (Fig. 1) comprises a plurality of spring leaves secured together by outer clips 32, and central U-bolts 33 secured to bracket 34. The right end of spring 31, as viewed in Fig. 1, rests on tapered plate 36, within U-shaped guide 37 welded on track roller frame 11 within housing 38, slidably mounted on track roller frame 11 for adjustably supporting front idler 23 mounted on the housing. Housing 38 is provided with an aperture of sufficient width to permit sliding thereof on frame 11 without striking guide 37 or spring 31. Guide 37 is provided with stop 39 above spring 31 for limiting relative vertical movement between the spring and frame 11. The left end of spring 31 is supported similarly within U-shaped guide 41, on track roller frame 12. Thus, the ends of the main equalizer member are supported on the track roller frames, for free lateral movement and restricted vertical movement, the guides 37, 41 preventing excessive movement of the spring ends longitudinally of track roller frames 11 and 12.

Main frame or body 10 (Fig. 1) at its front end includes side members 46, 47 having cross member 48 secured therebetween by suitable fastening bolts. Cross member 48 provides a mounting for engine 49 which is suitably secured thereto and to other body members, and also provides an engaging surface for the top of the equalizer bar. Member 48 has arcuate bottom wall 51 with spaced recesses 52 centrally thereof to receive the heads of U-bolts 33. The arcuate contour of wall 51 provides for relative rocking movement of the body on the main equalizer bar, while the inter-engagement of the wall and U-bolts 33 prevents relative lateral or endwise movement therebetween. Said member 48 (Fig. 3) is provided with vertically depending flanges 53 at each side of equalizer bar 31 to prevent the entry of deleteriously matter between wall 51 and bar 31, as well as to protect U-bolts 33 from injury by rocks, stumps and the like, encountered during operation of the tractor.

Bracket 34 which receives the ends of U-bolts 33 to secure the leaves of bar 31 together, extends longitudinally across bar 31 and has a recessed portion at each side of the main equalizer bar to receive the auxiliary equalizer bars in vertical overlapping relationship with respect to the main equalizer bar. The auxiliary equalizer bars are each similar in construction and are similarly connected to the main equalizer bar and to the tractor body. Front auxiliary equalizer bar 61 (Figs. 1 and 3) comprises a plurality of spring leaves secured together by outer clips 62, and at the center, by U-bolts 63 and bracket 64. Bracket 64 (Fig. 3) has vertically depending outer flange 66 and inside flanges 67 joined thereto; all said flanges extend below nuts 68 on U-bolts 63 to protect said bolts and nuts from injury from rocks, stumps and the like. Rear auxiliary bar 69 (Fig. 3) is similarly constructed.

The central portions of the auxiliary equalizer bars engage arcuate surfaces within the side recessed portions of bracket 34 under the main equalizer bar, and have their respective ends connected to the body by links having aligned pivotal connections therewith. Bracket 34 (Figs. 1 and 3) has similar opposite portions 71, 72 extending upwardly at each side of main bar 31 to provide engaging surfaces with auxiliary bars 61, 69. Portion 71 (Figs. 1 and 3) has arcuate under wall 73 having recesses 74 adapted to receive the heads of U-bolts 63. Portion 72 (Fig. 3) of bracket 34 is formed similarly to engage auxiliary bar 69. Respective vertical flanges 76 of bracket portions 71, 72 protect U-bolts 63 and springs 61, 69 from injury. Thus, it is seen that the auxiliary equalizer bars are connected to the main equalizer bar for relative rocking movement, while the inter-engaging portions thereof prevent relative endwise movement.

The left ends of the auxiliary bars as viewed in Fig. 1 are pivotally mounted on pin 81 (Figs. 1 and 4), the pin being pivoted in bosses 82 of links 83, extending upwardly therefrom at each side of main bar 31 and having their upper ends pivoted on cotter-held pin 84, pivotally mounted in boss 86 of cross member 48. The right ends of auxiliary bars 61, 69, as viewed in Fig. 1, are similarly connected by pin 87, links 88, and pin 89, adjacent the opposite end of body member 48.

From the foregoing description, it is seen that the connections from the body to the ends of the auxiliary equalizer springs or bars maintain engagement between body member 48 and main equalizer bar 31, and between bracket 34 and auxiliary equalizer bars 61, 69, as well as limit relative rocking movement between the body and the main equalizing bar. The above construction, which is particularly adapted for large, heavy duty tractors, not only provides a better equalizing action, but also, by virtue of the overlapping relationship between the auxiliary bars and the main bar, serves not to impede ground clearance for the tractor, whereby the tractor can pass freely over higher obstructions than would otherwise be possible. This is true, since if only one auxiliary bar were employed and mounted directly under the main bar, as has heretofore been done, then such one bar would have to be extremely heavy and thick and would, consequently, extend a considerable distance below the main bar, thus impeding ground clearance. The utilization of the bracket 34 to provide the engaging surfaces on the main equalizer bar for the auxiliary equalizer bars, provides a compact construction which consists of few parts and can readily be manufactured and assembled. It will be noted also that the fastening means for securing the various equalizer bars together are well protected from injury by rocks and the like which may be encountered during operation of the tractor, as often occurs, particularly under the conditions in which heavy duty tractors usually operate.

Therefore, I claim as my invention:
1. In a track-type tractor having a body and ground-engaging supports therefor movably connected thereto; a spring suspension for controlling movement of said supports with respect to said body, including an equalizer bar extending transversely of said body and having its ends supported by said supports, said body engaging said bar centrally thereof for relative rocking movement with respect thereto; said bar comprising a plurality of spring leaves, and connections for maintaining said leaves in assembled position; auxiliary equalizing means at each of two opposite sides of said bar, each of said auxiliary means comprising a plurality of spring leaves, and connections for maintaining said leaves in assembled position; a bracket on said bar having portions extending at each side thereof, said portions being recessed to receive said equalizing means in vertical overlapping relation with respect to said bar; and means connecting the ends of said equalizing means to said body; said body and said bracket having depending portions overlapping said connections to prevent injury thereof by obstructions encountered during tractor operation.

2. In a track-type tractor having a body and ground-engaging supports therefor movably connected thereto, mechanism for controlling movement of said supports with respect to said body, including an equalizer bar extending transversely of said body and having its ends supported by said supports, said body engaging said bar centrally thereof for relative rocking movement with respect thereto, auxiliary equalizing means at each of two opposite sides of said bar, said auxiliary means being mounted for relative rocking movement with respect to said bar, pivot means connecting adjacent ends of said auxiliary means, and links connecting said pivot means and said body.

3. In a track-type tractor having a body and ground-engaging supports therefor movably connected thereto, mechanism for controlling movement of said supports with respect to said body including an equalizer bar extending transversely of said body and having its ends supported by said supports, said body engaging said bar centrally thereof for relative rocking movement with respect thereto, auxiliary equalizing means at each of two opposite sides of said bar, a bracket on said bar having portions extending at each side thereof, said portions receiving said auxiliary equalizing means in vertical overlapping relation with respect to said bar and providing for relative rocking movement therebetween, and means common to adjacent ends of said auxiliary equalizing means for connecting said body thereto.

4. In a track-type tractor having a body and ground-engaging supports movably connected thereto, means interposed between said body and said supports for controlling relative movement between said body and said supports, said means comprising a main equalizer member extending transversely of said body, auxiliary equalizer members substantially parallel to said main member, bracket means connected to and positioned across said main member and having surfaces engaging said auxiliary members, said surfaces being arranged at the sides of said main member and being located adjacent the bottom of said main member, and means connecting said auxiliary members to said body.

5. In a track-type tractor having a body and ground-engaging supports movably connected thereto, means interposed between said body and said supports for controlling relative movement between said body and said supports, said means comprising a main equalizer member extending transversely of said body, auxiliary equalizer members substantially parallel to said main member, means for securing said main member to said body including a member engaging across the bottom of said main member and having surfaces at the sides thereof engaging said auxiliary members, and means connecting said auxiliary members to said body.

6. In a track-type tractor having a body and ground-engaging means movably connected to said body, equalizing means extending transversely of said body and connected to said ground-engaging means and to said body; said equalizing means including a main equalizer member, and a plurality of spaced auxiliary equalizer members, an auxiliary member being located at each of two opposite sides of said main member, and operatively connected to said main member, and means connecting each of said auxiliary members to said body.

7. In a track-type tractor having a body and ground-engaging means movably connected to said body, equalizing means extending transversely of said body and connected to said ground-engaging means and to said body; said equalizing means including a main equalizer member, and a plurality of auxiliary equalizer members interconnected with said main member and said body, said auxiliary members being disposed in vertical overlapping relation with said main member.

8. In a track-type tractor having a body and ground-engaging means movably connected to said body; an equalizing structure interposed between said body and said ground-engaging means, said structure comprising a main equalizer member connected to said ground-engaging means and supporting a portion of said body, and an auxiliary equalizer member interconnected with said body and said main member, said auxiliary member being mounted in vertical overlapping relationship with respect to said main member to enhance ground clearance.

9. In a track-type tractor having a body and ground-engaging means movably connected to said body; an equalizing structure interposed between said body and said ground-engaging means, said structure comprising a main equalizer member connected to said ground-engaging means and supporting a portion of said body, an auxiliary equalizer member positioned at each of two opposite sides of said main member, and means for supporting the auxiliary equalizer members with respect to said body and said main equalizer member.

10. In a track-type tractor having a body and ground-engaging means movably connected to said body; an equalizing structure interposed between said body and said ground-engaging means, said structure comprising a main equalizer member connected to said ground-engaging means and supporting a portion of said body, an auxiliary equalizer member positioned at each of two opposite sides of said main member and in vertical overlapping relationship with respect to said main member, and means connecting said auxiliary members to said body.

11. In a track-type tractor having a body and ground-engaging means movably connected to said body; an equalizing structure interposed between said body and said ground-engaging means, said structure comprising a main equalizer member connected to said ground-engaging means and supporting a portion of said body, said main member including a leaf spring construction and connecting means holding the leaves together, an auxiliary equalizer member positioned at each of two opposite sides of said main member, the auxiliary members each including a leaf spring construction and connecting means holding the leaves together, and means for mounting both the auxiliary members and the main member with respect to said body, said mounting means including members having recesses for shrouding and protecting said connecting means.

12. In a vehicle having a body and spaced ground-engaging means movably connected to said body, an equalizing structure interposed between said body and said ground-engaging means and supporting said body on said ground-engaging means; said equalizing structure including main equalizing means having its ends supported by said ground-engaging means, auxiliary equalizing means at a vertical side of said main equalizing means, and means interconnecting said main equalizing means, said auxiliary equalizing means and said body.

13. In a vehicle having a body and spaced ground-engaging means movably connected to said body, an equalizing structure interposed between said body and said ground-engaging means and supporting said body on said ground-engaging means; said equalizing structure including main equalizing means having its ends supported by said ground-engaging means, auxiliary equalizing means at each of two opposite sides of said main equalizing means, and means interconnecting said main equalizing means, said auxiliary equalizing means and said body.

14. In a vehicle having a body and spaced ground-engaging means movably connected to said body, an equalizing structure interposed between said body and said ground-engaging means and supporting said body on said ground-engaging means; said equalizing structure including main equalizing means having its ends supported by said ground-engaging means, auxiliary equalizing means associated with said main equalizing means, said auxiliary equalizing means and said main equalizing means being displaced with respect to each other in a direction extending longitudinally of said vehicle, and means interconnecting said main equalizing means, said auxiliary equalizing means and said body.

15. In a vehicle having a body and ground-engaging supports therefor movably connected thereto, mechanism for controlling movement of said supports with respect to said body, including an equalizer member extending transversely of said body and having its ends supported by said supports, said body being supported by said member intermediate the ends thereof and for relative rocking movement with respect thereto, auxiliary equalizing means at each of two opposite sides of said member, said auxiliary means being mounted for relative rocking movement with respect to said member, and means connecting said auxiliary means and said body.

16. In a vehicle having a body and spaced ground-engaging means movably connected to said body, mechanism for controlling movement of said ground-engaging means with respect to said body including main equalizing means extending transversely of and supporting said body and mounted on said ground-engaging means, auxiliary equalizing means displaced with respect to said main equalizing means in a direction extending longitudinally of said vehicle, and means interconnecting said auxiliary equalizing means, said main equalizing means and said body.

17. In a vehicle having a body and spaced ground-engaging means movably connected to said body, mechanism for controlling movement of said ground-engaging means with respect to said body including a main equalizing member extending transversely of and supporting said body and mounted on said ground-engaging means, an auxiliary equalizing member disposed in vertical overlapping relationship with respect to said main equalizing member, and means interconnecting said auxiliary member, said main member, and said body.

HARMON S. EBERHARD.